INVENTORS.
ROBERT ASHTON
WILBERT D. WEBER
BY WALTER HIRSCH

Tweedale & Gerhardt
ATTORNEYS.

United States Patent Office 3,457,797
Patented July 29, 1969

3,457,797
VARIABLE SPEED DRIVE
Robert Ashton, Islington, Ontario, Wilbert D. Weber, Nashville, Ontario, and Walter Hirsch, Don Mills, Ontario, Canada, assignors to Massey-Ferguson Industries Limited, Toronto, Ontario, Canada
Filed Oct. 12, 1967, Ser. No. 674,885
Int. Cl. F16h *55/44, 7/10*
U.S. Cl. 74—230.17     10 Claims

ABSTRACT OF THE DISCLOSURE

A variable speed drive including a variable speed double pulley assembly with a pair of pulleys having variable, inversely proportional diameters respectively connected by belts to spaced input and output pulleys. The variable speed pulley assembly is slideably mounted on a carrier member which is movable in opposite directions with respect to the input and output pulleys to vary the speed of the output pulley. A belt tensioning device is mounted on the carrier member for exerting tension on the belts through exertion of a constant force on the variable speed pulley assembly in all positions of the carrier member.

---

This invention relates generally to transmissions and is particularly concerned with variable speed belt drives.

It is conventional to transmit drive from an input pulley to the output pulley through a variable speed double pulley assembly having inversely proportional diameters such that by moving the variable speed pulley assembly relative to the input and output pulleys, the drive ratio between the input and output pulley is adjusted. In such arrangements, it is frequently a problem to maintain the proper belt tension during movement of the variable speed pulley assembly and after its position has been adjusted.

It is an object of this invention therefore to provide a variable speed belt drive wherein the speed ratio and proper belt tension can be accurately controlled throughout the operating range of the drive.

Another object is to provide a variable speed belt drive having a movable variable speed drive unit including a pair of variable pulleys having inversely proportional diameters in which tension is maintained on the belts through application of a constant force to the variable speed drive unit in all positions thereof with respect to the input and output pulleys of the drive.

In accordance with the present invention, a variable speed drive unit having a pair of pulleys of inversely proportional variable diameters is slideably mounted on a carrier member which in turn is movably mounted on a supporting frame. Spaced input and output pulleys are respectively connected by belts with the variable speed pulleys so that movement in opposite directions by the variable speed drive unit on the carrier member varies the speed on the output pulley with respect to the input pulley. Proper tension is maintained on the belts by a belt tensioning device mounted on the carrier and connected with the variable speed drive unit to maintain a constant force on the variable speed drive unit in all positions of the carrier member.

Other objects, advantages and features of the invention will become apparent from the following description taken in connection with the accompanying drawing in which.

Figure 1:
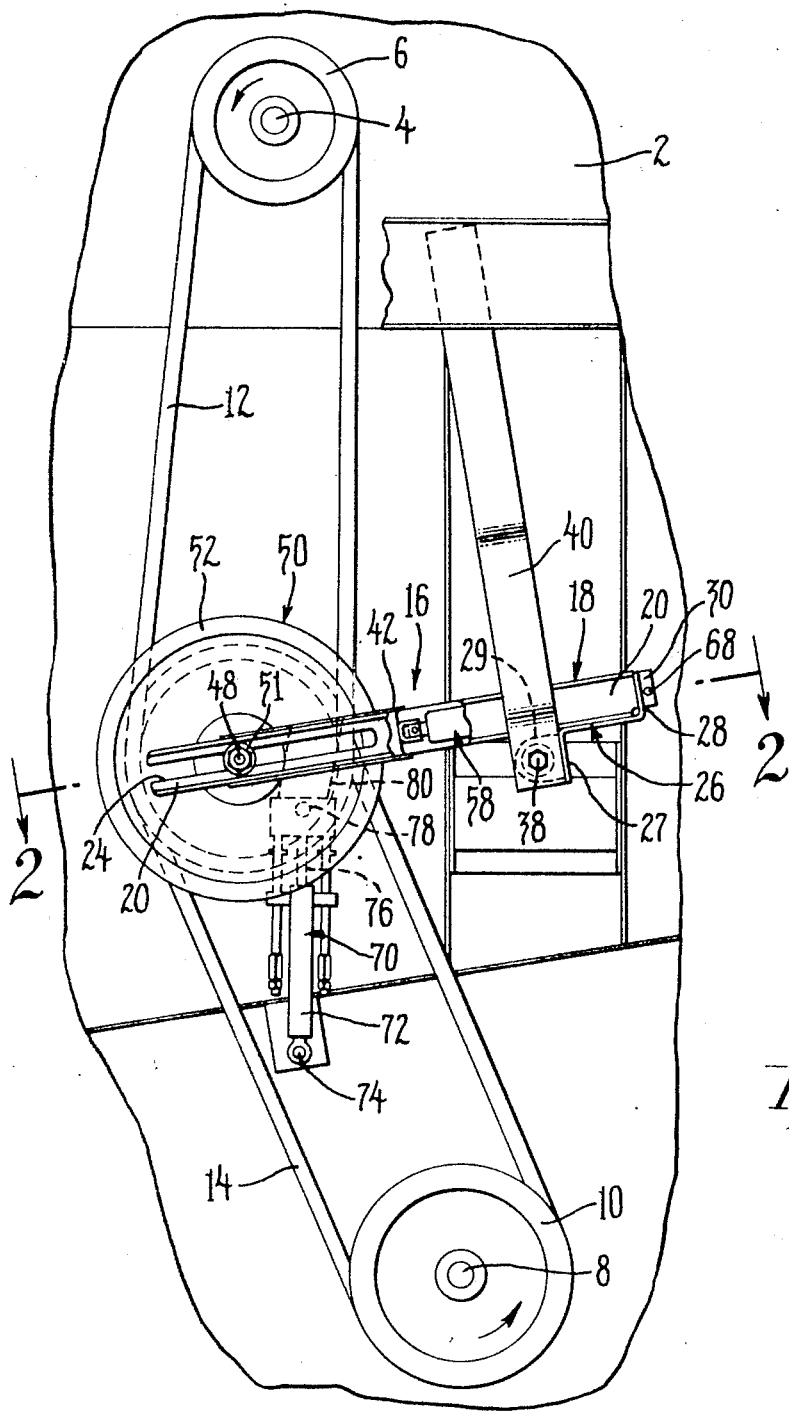
FIG. 1 is an elevational view of a variable speed belt drive embodying the invention.

In FIG. 1, reference numeral 2 designates a supporting frame or body of a self-propelled vehicle such as an agricultural combine. Fixed to the end of an input shaft 4 is an input pulley 6, and an output pulley 10 is fixed to the end of an output shaft 8. Pulleys 6 and 8 are drivingly connected together by belts 12 and 14 extending respectively from pulleys 6 and 8 to a variable speed drive unit designated collectively by reference numeral 16.

The variable speed drive unit 16 is mounted on a carrier member 18 which in turn is movably mounted on the supporting frame 2 and includes a pair of spaced, parallel arms 20 and 22 each formed with an elongated slot 24. Arms 20 and 22 of the carrier member 18 are secured together at one end by a bracket 26 having a depending flange 27 and an upstanding flange 28. A pair of spaced, apertured lugs 29 are formed on the depending flange 27 for supporting a tubular sleeve 32 extending transversely between the arms 20 and 22. Rearwardly projecting ears 30 are formed intermediate the ends of the upstanding flange 28. Sleeve 32 rotatably receives a shaft 34 which is mounted in a bearing member 36 supported in frame 2. The opposite end of shaft 34 is secured to a post or upright frame member 40 by a conventional fastener 38. Consequently, the carrier member 18 is pivotally supported on the supporting frame 2 for rotation about the axis of shaft 34.

Figure 2:
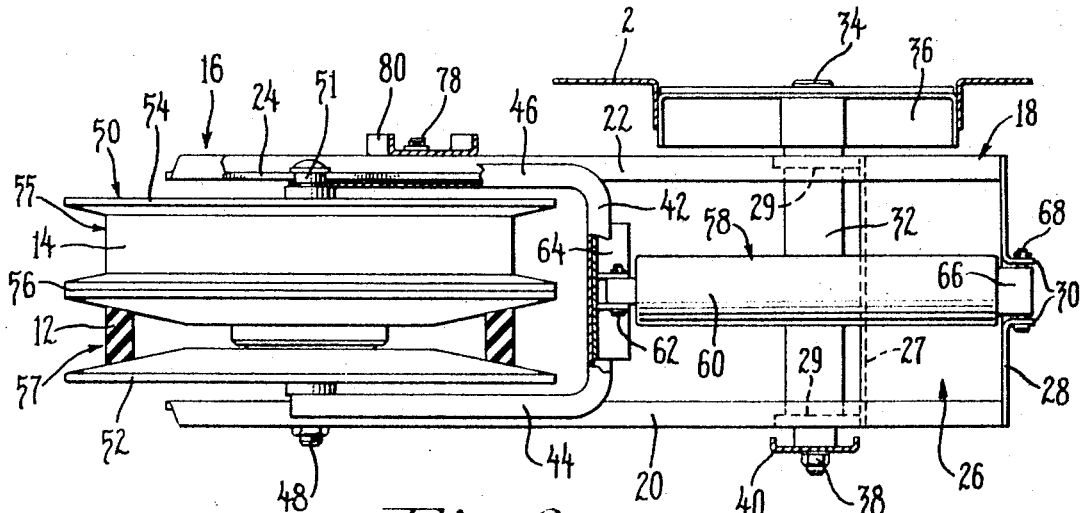
FIG. 2 is a sectional view taken along lines 2—2 of FIG. 1.

The variable speed drive unit 16 includes a yoke member 42 with spaced, parallel arms 44 and 46 between which is supported the shaft 48 of a double pulley assembly 50. Rollers 51 are mounted on shaft 48 for engagement with slots 24 in the arms of carrier member 18 such that the double pulley assembly and yoke are slideably supported on carrier member 18 for movement along the length of arms 20 and 22. The double pulley assembly 50 includes a pair of fixed sheaves 52 and 54 between which is mounted a movable sheave 56. The movable sheave 56 cooperates with the fixed sheaves 52 and 54 to define a pair of pulleys 55 and 57 having variable, inversely proportional diameters for engagement respectively with belts 14 and 12 as shown in FIG. 2. Movement of sheave 56 toward sheave 54 increases the effective diameter of pulley 55 on which belt 14 is mounted and correspondingly decreases the effective diameter of pulley 57 on which belt 12 is mounted.

Mounted between the base portion of yoke 42 and the upstanding flange 28 of bracket 26 is a hydraulic ram 58. The cylinder 60 of ram 58 is pivotally connected by a pin 62 to a bracket 64 mounted on the base member of yoke 42. The piston 66 of ram 58 is pivotally connected by pin 68 to the lugs 40. Cylinder 60 is connected with a source of constant pressure and fluid pressure within cylinder 60 tends to extend piston 66 from the cylinder and bias the double pulley assembly 50 and yoke 42 toward the left as viewed in FIG. 2. Consequently, by maintaining a constant fluid pressure in the cylinder of ram 58 tending to extend the ram, tension on belts 12 and 14 is maintained by applying a constant force to the double pulley assembly 50. A relief valve may be provided in the hydraulic system to limit the pressure in cylinder 60 and prevent overload of the ram and belts.

In the illustrated embodiment, carrier member 18 is moved about the axis of shaft 34 by a hydraulic ram 70 having its cylinder 72 pivotally mounted at 74 on frame 2, and its piston 76 pivotally connected by a pin 78 to an actuating arm 80 in the form of a channel section (FIG. 2). Extension of ram 70 causes carrier member 18 to move in a clockwise direction to decrease the distance between the double pulley assembly 50 and the input pulley 6 to thereby cause the movable sheave 56 to move toward the fixed sheave 52 and increase the diameter of the variable pulley portion 57. As the carrier member moves about the axis of shaft 34, the ram 58 maintains proper tension on belts 12 and 14 by permitting the double pulley assembly and yoke 42 to move along slots 24 as the carrier member changes position.

Figure 3:
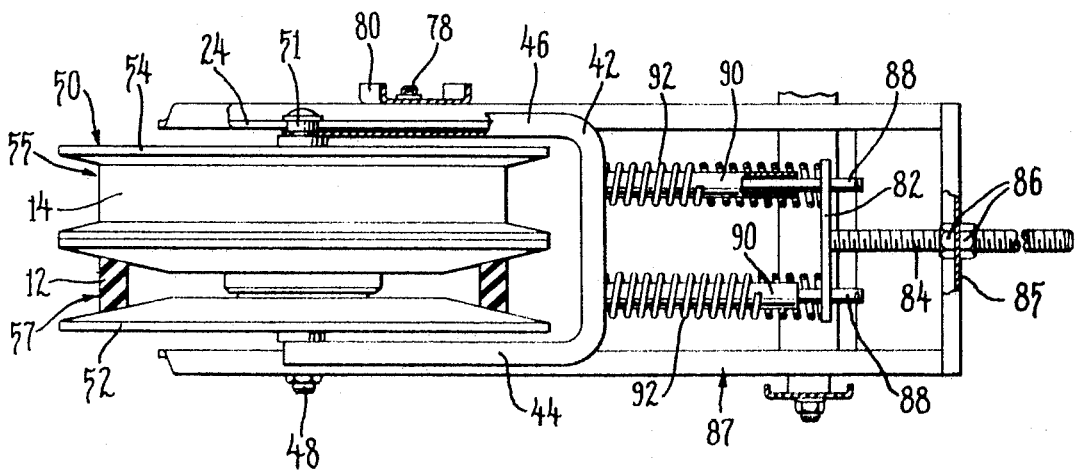
FIG. 3 is a view similar to FIG. 2 illustrating a modified from of the invention.

FIG. 3 illustrates a modified arrangement of the invention wherein a spring assembly is utilized in place of the hydraulic ram 58. A spring seat plate 82 is carried by one end of a threaded rod 84 mounted in a cross member 85 secured between the ends of the parallel arms of a carrier member 87 which corresponds to carrier member 18 in the FIG. 2 embodiment. Lock nuts 86 maintain the threaded rod 84 in its adjusted position with respect to the frame portion 85. The spring support plate 82 is apertured adjacent its ends to receive rods 88 which are telescopically received in cylinders 90 seated against the base portion of yoke 42. Coil springs 92 are seated between spring seat member 82 and the base portion of yoke member 42 and surround the rods and cylinders 88, 90 to urge yoke 42 toward the left and maintain substantially proper tension on belts 12 and 14.

While specific embodiments of the invention have been illustrated and described in the foregoing specification, it will be apparent to those skilled in the art that the invention is not limited to the exact construction shown, but that various alterations and modifications can be made without departing from the scope and spirit of the invention.

We claim:

1. A variable speed drive comprising a supporting frame; a carrier member movably mounted on the supporting frame; a variable speed drive unit slideably mounted on the carrier member, said variable speed drive unit comprising a pair of pulleys having variable, inversely proportional diameters; an input pulley and an output pulley spaced apart a fixed distance from each other; a first belt connecting the input pulley with one of said pair of pulleys and a second belt connecting the output pulley with the other of said pair of pulleys so that rotation of said input pulley is transmitted to said output pulley through said variable speed drive unit; said input and output pulleys being arranged with respect to said carrier member such that movement of the carrier member in one direction increases the distance between the variable speed pulley and the input pulley to thereby decrease the diameter of said one pulley of said pair and proportionally increase the diameter of said other pulley of said pair, and movement of the carrier member in the opposite direction increases the distance between the variable speed pulley and said output pulley to thereby decrease the diameter of said other pulley of said pair and proportionally increase the diameter of said one pulley of said pair; and belt tensioning means mounted between said carrier member and said variable speed drive unit for applying a continuous force on said variable speed drive unit to tension the belts in all positions of the carrier member by permitting the variable speed drive unit to slide along the carrier member as the carrier member changes position.

2. A variable speed drive as claimed in claim 1 wherein said belt tensioning means comprises an expansible and contractible constant pressure hydraulic ram having one end mounted on the carrier member and its other end connected with the variable speed drive unit, said ram thereby exerting a constant force on said variable speed drive unit.

3. A variable speed drive as claimed in claim 1 wherein said carrier member includes a pair of spaced, parallel arms each having an elongated slot, and wherein said variable speed drive unit is mounted in said slots.

4. A variable speed drive as claimed in claim 3 wherein said variable speed drive unit further comprises a U-shaped yoke member having a pair of spaced, parallel arms joined by a base portion with said pair of pulleys being received between the yoke arms and having a shaft mounted on said arms, and rollers on the ends of said shaft engaged with the slots in the arms of the carrier member.

5. A variable speed drive as claimed in claim 4 further including means securing the arms of the carrier member together adjacent their ends, and wherein said belt tensioning means is mounted between said securing means and the base portion of the yoke member.

6. A variable speed drive as claimed in claim 5 wherein said securing means comprises a bracket having an upstanding flange formed with a pair of apertured ears; and wherein said belt tensioning means comprises a hydraulic ram the piston of which is connected with said ears and the cylinder of which is connected with the base portion of said yoke member, such that fluid pressure within the cylinder tends to cause the piston to extend from the cylinder and move the variable speed drive unit along the slots in the carrier arms away from said bracket and apply tension to said belts, said cylinder being connected with a source of constant pressure whereby the piston will retract into the cylinder to permit the variable speed drive unit to move toward the bracket to prevent the constant force from being exceeded and will extend from the cylinder to prevent a decrease in the force.

7. A variable speed drive as claimed in claim 6 wherein said bracket includes a depending flange having a pair of forwardly projecting lugs; and further including a sleeve member supported by said lugs and extending transversely of said carrier arms; a shaft rotatably received within said sleeve, said shaft having one end mounted on the supporting frame whereby the carrier member is pivotally mounted on said supporting frame and moves about the axis of said shaft to vary the drive between the input and output pulleys.

8. A variable speed drive as claimed in claim 5 wherein said securing means comprises a cross member extending between the ends of the carrier arms; and wherein said belt tensioning means comprises a spring assembly mounted between said cross member and the base portion of said yoke member, for biasing the variable speed drive unit in a direction to apply tension to said belts, and means for adjusting the biasing force of said spring assembly.

9. A variable speed drive as claimed in claim 8 wherein said adjusting means comprises a threaded rod adjustably mounted in said cross member; and wherein said spring assembly comprises a spring support plate carried by said threaded rod; a pair of cylinders seated at one end against the base portion of said yoke member, a pair of guide rods mounted on the spring support plate and each telescopically received in one of said cylinders, and a coil spring surrounding each of the cylinders with its ends mounted between the base portion of the yoke member and said spring support plate.

10. A variable speed drive as claimed in claim 1 wherein said belt tensioning means comprises spring means mounted between the carrier member and variable speed drive unit.

References Cited

UNITED STATES PATENTS

| | | | |
|---|---|---|---|
| 1,514,158 | 11/1924 | Holt | 74—242.14 XR |
| 1,663,344 | 3/1928 | Lennard | 74—242.14 XR |
| 2,054,533 | 9/1936 | Baker et al. | 74—242.14 |
| 2,082,688 | 6/1937 | Dekker | 74—242.14 |
| 2,401,670 | 6/1946 | Spetz. | |
| 2,639,569 | 5/1953 | Pasturczak | 74—230.17 XR |
| 2,843,431 | 7/1958 | Beaufort. | |

FRED C. MATTERN, JR., Primary Examiner

JAMES A. WONG, Assistant Examiner

U.S. Cl. X.R.

74—242.14, 242.15